US012011875B1

(12) United States Patent
Noyes

(10) Patent No.: US 12,011,875 B1
(45) Date of Patent: Jun. 18, 2024

(54) SECONDARY OBJECT INTEGRATION OPTIONS FOR 3D ELECTROPHOTOGRAPHY BASED ADDITIVE MANUFACTURING

(71) Applicant: ResnENT, LLC, Bloomington, IL (US)

(72) Inventor: Willard S. Noyes, Bloomington, IL (US)

(73) Assignee: ResnENT, LLC, Bloomington, IL (US)

( * ) Notice: Subject to any disclaimer, the term of this patent is extended or adjusted under 35 U.S.C. 154(b) by 0 days.

(21) Appl. No.: 17/654,053

(22) Filed: Mar. 8, 2022

Related U.S. Application Data

(60) Provisional application No. 63/158,759, filed on Mar. 9, 2021.

(51) Int. Cl.

| | | |
|---|---|---|
| B33Y 10/00 | (2015.01) | |
| B29C 64/188 | (2017.01) | |
| B29C 64/295 | (2017.01) | |
| B29C 64/314 | (2017.01) | |
| B29C 64/393 | (2017.01) | |
| B33Y 40/00 | (2020.01) | |

(52) U.S. Cl.
CPC .......... *B29C 64/188* (2017.08); *B29C 64/295* (2017.08); *B29C 64/314* (2017.08); *B29C 64/393* (2017.08); *B33Y 10/00* (2014.12); *B33Y 40/00* (2014.12)

(58) Field of Classification Search
CPC ............................. B33Y 10/00; B29C 64/295
See application file for complete search history.

(56) References Cited

U.S. PATENT DOCUMENTS

| | | | |
|---|---|---|---|
| 10,330,404 B2 | 6/2019 | Rhoden et al. | |
| 10,449,716 B2 | 10/2019 | Hikmet et al. | |
| 2016/0129633 A1* | 5/2016 | Huang | B29C 64/112 425/150 |
| 2017/0021571 A1* | 1/2017 | Haga | B29C 64/112 |
| 2018/0257259 A1 | 9/2018 | Moharrer | |
| 2019/0291402 A1* | 9/2019 | Amba | B32B 37/15 |
| 2021/0101350 A1 | 4/2021 | Aitharaju et al. | |
| 2022/0072773 A1* | 3/2022 | Erickson | B29C 64/205 |

FOREIGN PATENT DOCUMENTS

| | | |
|---|---|---|
| CN | 106767480 A | 5/2017 |
| TW | 201834833 A | 1/2018 |
| WO | WO 2021/114603 A1 | 7/2021 |

* cited by examiner

*Primary Examiner* — Farah Taufiq
(74) *Attorney, Agent, or Firm* — Knobbe, Martens, Olson & Bear LLP

(57) ABSTRACT

An additive manufacturing system and method for including non-printable secondary materials, such as wire, metal, ceramic, electronics, optical fibers, or other materials, within a printed object. A first layer of the printed object includes a recess sized to fit a non-printable secondary material. The non-printable secondary material that aligns with an upper surface of the first layer is inserted within the recess. A heater roller flattens the upper surface, including the non-printable secondary material, to form a flat, printable surface for a second layer. The second layer is then deposited over the upper surface of the first layer and the non-printable secondary material. The non-printable secondary material can be suspended in a tray that aligns with the printed object and drops below the upper surface of the printed object to facilitate printing of the second layer.

29 Claims, 5 Drawing Sheets

SECONDARY OBJECT INTEGRATION OPTIONS FOR 3D ELECTROPHOTOGRAPHY BASED ADDITIVE MANUFACTURING

CROSS REFERENCE

This application claims the benefit of U.S. Patent Application No. 63/158,759, filed Mar. 9, 2021, the entirety of which is hereby incorporated by reference.

BACKGROUND

Field

This disclosure generally relates to systems and methods for 3D printing. Certain embodiments of this disclosure specifically relate to systems and methods for imbedding non-printable secondary materials within a printed medium.

Related Art

Additive manufacturing technologies (e.g., three-dimensional (3D) printing) are revolutionizing medical device manufacturing. Additive manufacturing techniques, such as electrophotography, offer the advantage of simultaneously printing with multiple compounds each with independent physical properties within the same build cycle. Such processes have been shown to produce objects with seamless transition between rigid and flexible segments within the same object. In order to simplify additive fabrication processes, various improvements are contemplated herein.

SUMMARY

This disclosure describes a method by which secondary materials can be added to a standard object base layer by the serial addition of stacked trays or frames containing secondary materials in a manner that does not alter the vertical height of the base layer being printed. Several methods by which to achieve the addition of secondary materials are envisioned. The secondary trays could be square, rectangular, or circular in shape. During the initial layering of material, the vertical height of the base plate object is built up to a certain vertical height so as to allow for a depressed groove or depression to be formed within the base object. Once the customized depression reaches a desired (e.g., predetermined) shape and height, the printing process would be halted to allow for the application of a secondary plate/frame on top of the first.

DETAILED DESCRIPTION

Figure 1:
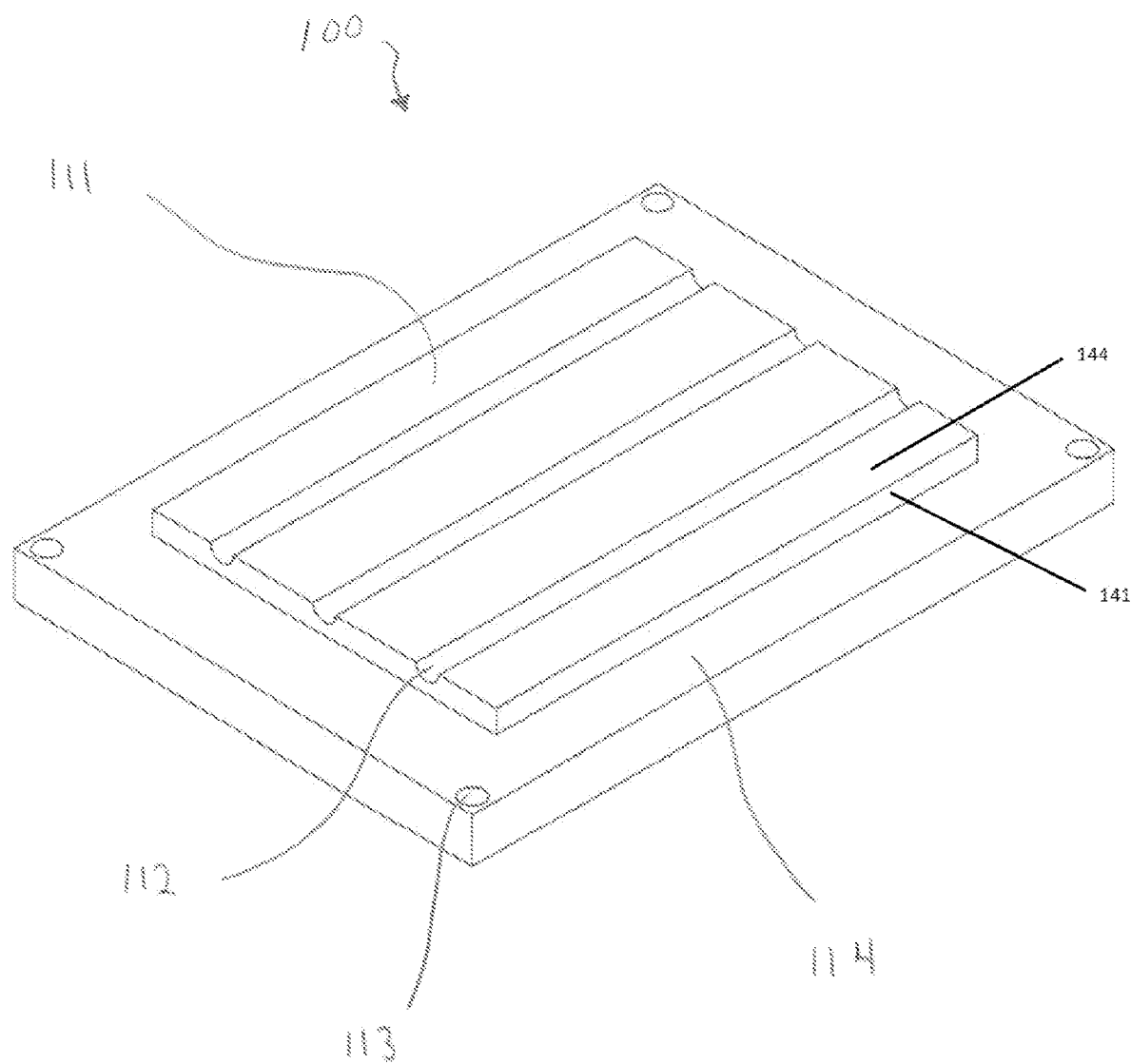
FIG. 1 is a base object showing added grooves to receive secondary materials in an upper surface of a first layer of material.

Electrophotography-based additive manufacturing techniques, amongst others, utilize a single plate or other support substrate upon which a layered compound deposition occurs. The height of the object layer increases as the object is built. Electrophotography-based additive manufacturing techniques can include multiple compounds each with independent physical properties within the same build cycle. By utilizing a dissolvable structure compound along with the permanent compounds making up the printed product, multiple sub-component assemblies within the same build can be introduced and later separated/released from one another during the support substance removal process. In such a manner, gears and spring-loaded components within the device can be made with no need for post print assembly.

It is also desirable to, at times, include non-printable subcomponents (secondary objects/materials) within the object being printed. Such non-printable subcomponents may include wires, metallic objects, ceramics, electronics, optical fibers, or other preassembled components within the 3D printed object. However, these non-printable subcomponents may be difficult to insert after the printing process is complete. Wires, for instance, would have to be threaded through the object. Openings for wire placement would have to be formed large enough to accommodate advancement of the wire. Friction between the wire and channel walls would be prohibitive. Wire advancement through a non-linear channel would also be difficult. Accordingly, a need exists for introducing non-printable objects within a 3D printed object during printing. Such a system and method would offer a considerable manufacturing advantage over existing technologies.

Obstacles to secondary material insertion are multiple. These obstacles include the need to overcome the effect of temperature cooling on layer adherence as secondary materials are placed into position within the base plate structure. Also, the base plate position must remain stable during addition of secondary materials. Subsequent thermoplastic layers may not stick to the object being placed within the primary structure. For instance, it would be difficult to adhere the 3D compound printed polymer to a metallic object.

This disclosure provides for a method to integrate non-3D printable objects into a 3D printed object ("base object") during an electrophotography or other 3D print cycle. With the notable exception of stereolithography, most 3D print technologies print from the bottom up. Current electrophotography methods cycle a flat base plate back and forth beneath an electrically charged, particle coated, film plate. The heated film plate deposits 0.01-0.025 mm thick layer of substance on the base layer thereby serially depositing multiple layers on top of one another; each layer bound to the layer beneath by thermal and pressure fixation.

This disclosure describes a method by which secondary materials can be added to a base object by the serial addition of stacked trays or frames containing secondary materials in a manner that does not alter the vertical height of the base layer being printed. Several methods by which to achieve the addition of secondary materials are envisioned. The secondary trays could be square, rectangular, or circular in shape. During the initial layering of material, the vertical height of the base plate object is built up to a certain vertical height so as to allow for a depressed groove or depression to be formed within the base object. Once the customized depression reaches a desired (e.g., predetermined) shape and height, the printing process would be halted to allow for the application of a secondary plate/frame on top of the first.

Each corner, side, or circumference of the base plate can include one or more holes capable of receiving one or more corresponding posts installed along the corners/periphery of a separate secondary plate or frame. The base plate can remain in-position within the floor of the printer. The printer compartment would be opened allowing the secondary frame containing the suspended object to be placed overtop the base plate. This maneuver could be performed manually, robotically, or in an otherwise automated fashion. Automating the process would allow for increase speed and prevent cooling of the objects.

The secondary tray can be secured into position overtop the base plate by securing its multiple posts within the holes along the periphery of the base plate without disturbing the position of the base plate. Once in its final position, the height of the secondary frame and object suspended within it would be in a position at or lower than the height of the base object being built. Printing is then resumed in the normal fashion. The same process could be repeated for additional trays as required. The posts of the additional trays would each have a hole capable of receiving the next level tray which in turn would have posts of slightly smaller diameter than the tray beneath it.

In order to minimize any issues that could impede subsequent thermal deposition layers from adhering to the foreign material being presented, the secondary plate and suspended object could be preassembled in a manner that would encase the object inside a separately 3D printed material or object, such as the material of the base object. This might involve a longitudinally oriented, elongated, semicircular housing with a flat bottom corresponding in size and cross-sectional dimension to the groove formed within the base plate object.

As an example, electrical wires could be snapped or glued into this elongated housing. On both ends of the elongated housing, thin strands of suspension material, either 3D printed from the same material as the elongated (now wire containing) housing or perhaps using monofilament polymer strands/wires/films incorporated into the housing, would be used to suspend the object from the periphery of the secondary plate/frame. At the time of secondary frame placement, the suspended semi-circular inserts and incorporated wires would be lowered into the grooves already present within the base object. Downward tension on the suspension strands/wires/films applied from the weight of the peripheral secondary frame would keep the objects in place and seated within the channel.

In this manner, the top surface of the combined base object and secondary plate objects can remain flat. Subsequent layering of material could be resumed accordingly without the need for further adjustment. The secondary materials in this example could be preheated (i.e., before assembly with the base object) to maximize thermal adherence to the base object.

Another method of adding structural support to a plastic 3D printed base object might involve inserting wires crisscrossed into a mesh or lattice. The wire complex could be heated and embedded into the base object by tension and pressure either from the weight of the frame or applied by a pressure roller. A mesh of wires imbedded into the primary object in this fashion would provide reinforced structural support to a plastic 3D printed object. Reinforcement wires could be placed in a variable pattern and within several layers of the printed object.

Another method would involve layering secondary materials onto a base plate object by using trays, plates, or disks that instead of having posts, might have a magnetized rim. In order to minimize magnetic interference with the printed polymers, the base plate could move away from the primary print rollers, a secondary tray with suspended film or objects applied overtop the base layer, and the metal rim of the secondary tray secured with an electromagnet while the secondary material is being thermally or pressure applied to the base layer. The magnet could then be turned off, the secondary tray/rim removed, and the base plate returned to the printer for continued printing.

Another method for securing secondary materials within the frame of a secondary tray might involve an adhesive film under which the objects are adhesively secured. The film would be suspended within the peripheral frame in the same manner as described above. The adhesive film could be uniform, perforated, translucent, of variable thickness, or otherwise fashioned in a manner that would maximize thermal adherence of the polymer substance applied with each print cycle. The adhesive film could be heated and made of the same or different polymer substance as the layer beneath it and to which it is being applied. In this manner, the adhesive film would be incorporated into the 3D printed object as another layer along with the object to which it is attached.

As noted above, the adhesive film under which the objects are suspended might be placed over the base object and a stamp plate or roller used to embed the object into position. The peripheral rim which had been securing the film and suspended objects can then be separated and moved out of the way to allow for a next layer to be applied to the base object. In this manner, multiple trays of wires and objects could be applied in a conveyor belt like fashion without the limitation of posts which might limit the number of trays applied.

As stated previously, the vertical height along the periphery of each layered tray, when applied with its contained object, would need to rest at or below the vertical height of the base object on the primary plate. In some instances, the base plate itself could have an elevated central platform upon which the base object print is initiated in order to allow for the secondary plate and object to fall below the height of the base layer. Such a configuration could allow for insertion of additional objects at a much earlier stage in the process.

Multiple plates containing multiple objects could be either rotated or placed into position in a serial manner to allow suspended objects to drop down and secure into position via a pre-programmed course for positioning within the print. Alternatively, the base plate could move up to meet the secondary layer and then drop down again into its normal position.

Another option might involve a mechanism to secure the suspension wires to hooks or tabs located along the periphery of the primary base plate in a manner loosely comparable to a textile loom that holds warp threads under tension so as to facilitate the interweaving of weft threads.

Regardless of the method, the intent is to quickly place and secure secondary materials into a primary object without altering the primary object's position within the printer or to impede the thermal adherence properties of the materials being combined.

In order to ensure a flat surface on the base object prior to resuming the print on top of the inserted object, a heated roller may be used to flatten out any surface irregularities that may arise after placement of any additional tray layers and/or fill any gaps left between the secondary material and the flat surface. The objects being inserted and/or the base object (e.g., at least the top layer(s)) may also need to be heated to allow for adequate bonding of the primary and secondary materials and print layers between the pauses of the print cycle. To facilitate this warming, the objects suspended within the secondary plate could be warmed by transferring heat through the wires and frame comprising the suspension apparatus. The print chamber would also be heated as could the print rollers, rollers used for flattening, and the metal plate upon which the base layer is being built.

FIG. 1 shows an implementation 100 of an initial 3D base object 111 attached to a base plate 114 containing one or more grooves or indentations 112 (e.g., three grooves) formed within the initial phase of the 3D print cycle. The base object 111 can be formed on one or more layers 141 of printed material. The one or more layers 141 can include an upper surface 144. The grooves or indentations 112 can be formed of the one or more layers 141. The grooves or indentations 112 can have any form factor, including a trench that extends from one side to another side of the base object 111 (e.g., for a wire). On the corners of the base plate are four separate holes 113 which will later be used to receive the posts 133 of a secondary tray 120.

Figure 2:
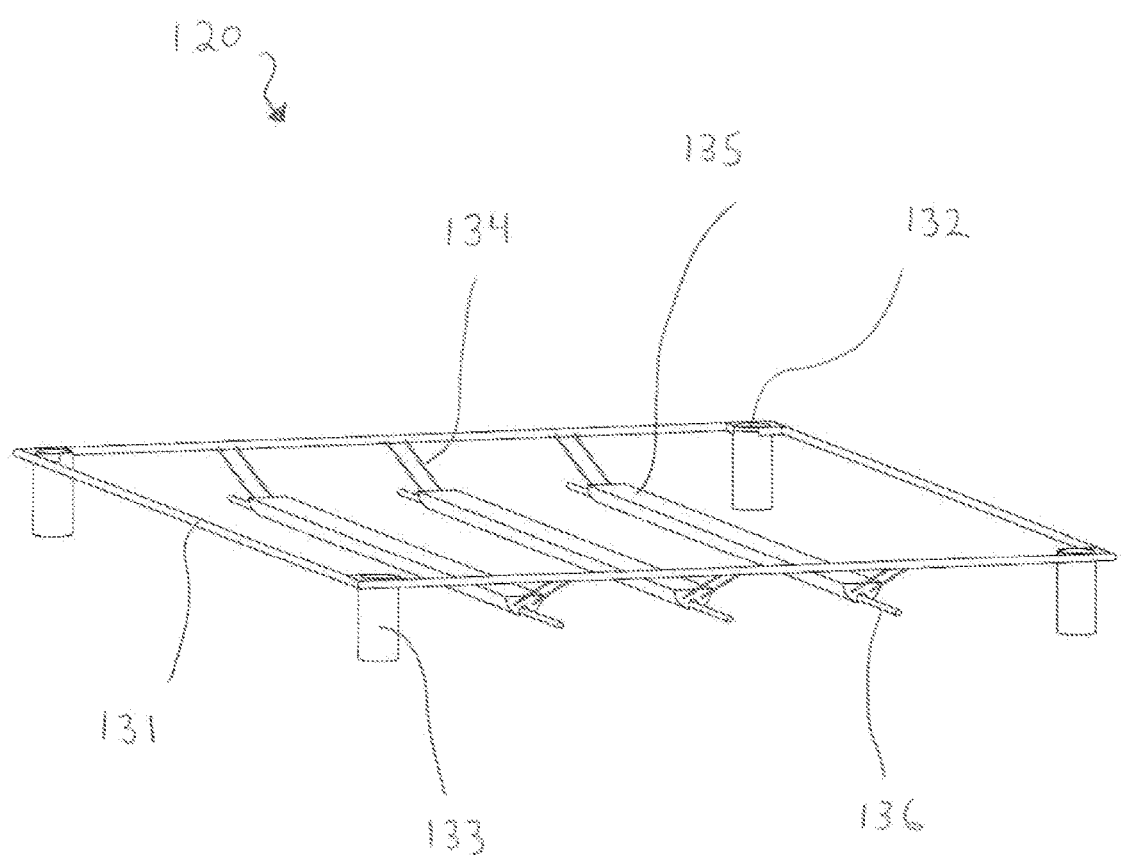
FIG. 2 is a 3D printed object suspended within secondary frame with enclosed wires.

FIG. 2 shows implementation 120 of a secondary tray which in this embodiment contains a peripheral metal rim or frame 131. Suspended between the peripheral metal rim are one or more secondary materials 135. The secondary materials 135 can have a semicircular elongated shape. the secondary materials can include metal wires 136 that were assembled into the secondary materials prior to suspending them within the frame 131 via a series of suspension wires/filaments 134. Two wires/filaments 134 can be used to prevent rotation of the secondary material 135. By using suspension wires, the secondary materials are allowed to free float in space with enough slack on the suspension filaments to allow for the secondary wire frame to drop below the vertical height of the base object once the two trays/plates are combined (FIG. 4. Located on the corners of the metal rim of the secondary tray 120 are four hollow posts 133 that are precisely spaced so as to line up with the corner holes of base plate 114. The outer diameter of the posts 133 are slightly smaller than the inner diameter of the holes located in base plate 114.

Figure 3:
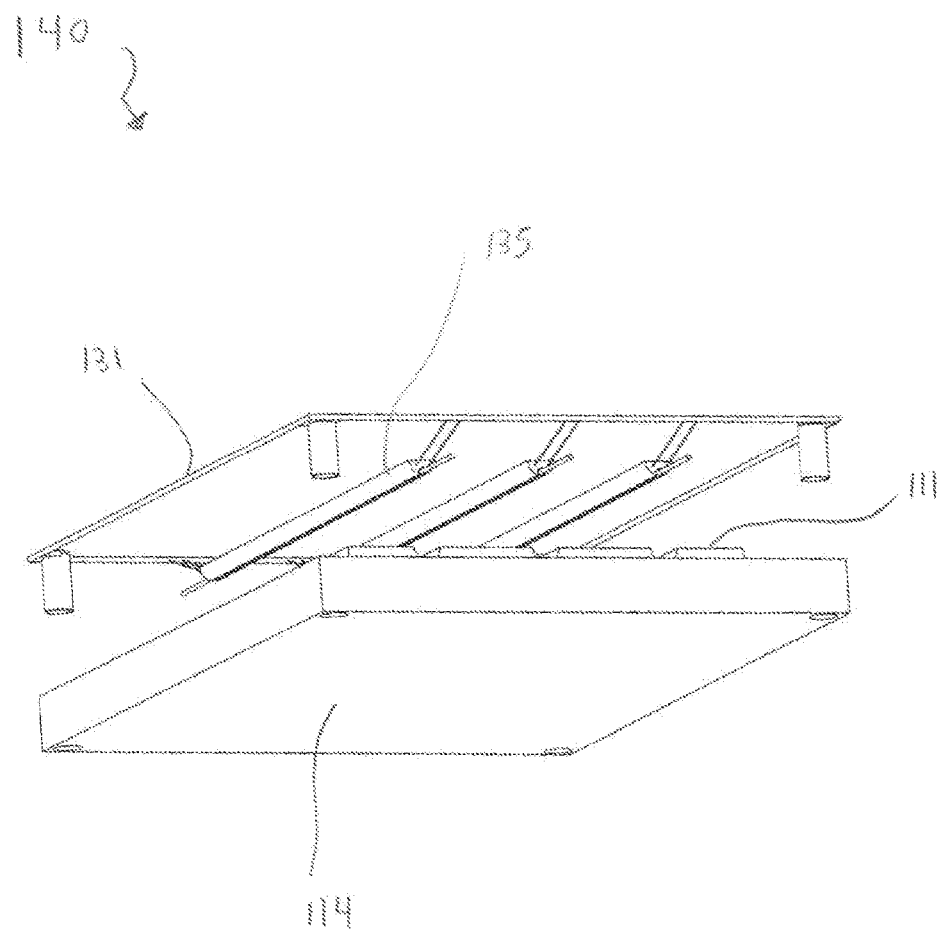
FIG. 3 is a secondary tray/frame with suspended objects ready to be fitted over base plate object.

FIG. 3 shows an exploded view of an assembly 140 demonstrating the alignment of the secondary tray 120 overtop the base object 111 and base plate 114. Precise spacing and alignment of the secondary materials 135) above the grooved indentations 112 will allow the secondary materials to fall into position within the grooves when the trays/plates are combined. In order to precisely position the secondary material 135 within the base object 111, a position of the secondary material 135 can be measured using optical cameras, lasers, or other sensors. The position of the secondary material 135 can be compared with a position of the base object 111, groove 112, base plate 114 or another reference point to ensure correct placement of the secondary material 135. If the secondary material 135 is not placed properly, an alert can call the attention of an operator. If the secondary material is determined to be placed properly, depositing additional layers of material can be continued.

Figure 4:
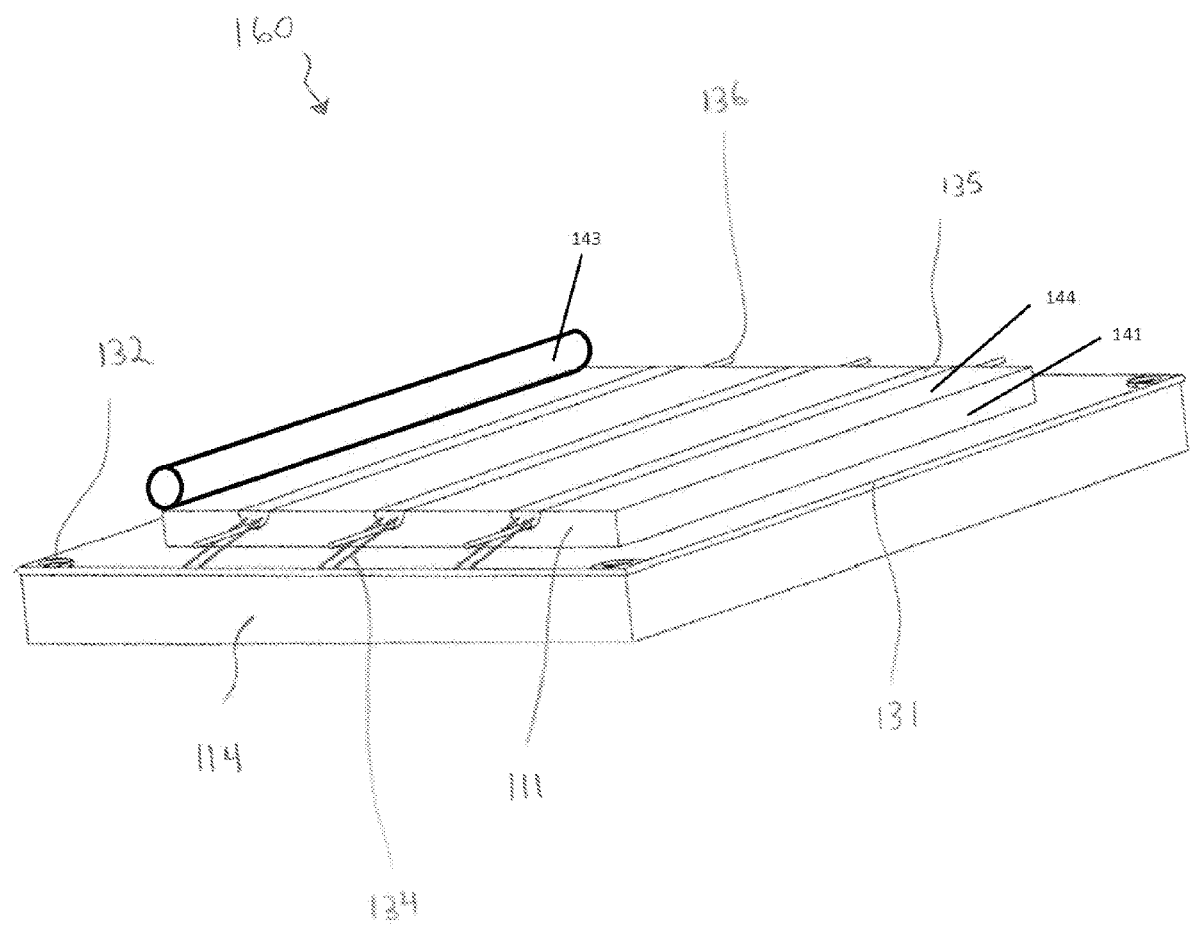
FIG. 4 is a diagrammatic view of fully integrated primary and secondary plates.

FIG. 4 shows the assembly 140 in an assembled configuration with the base plate 114 assembled with the secondary tray 120. The posts 133 are received within the holes 113 Secondary materials are shown to be fully integrated within the 3D printed grooves of the base object. Suspension wires 134 allow the secondary tray 120 to fall below the vertical height of base object 111 when the secondary tray is fully installed upon the base plate 114. The surface of the now combined 3D printed objects remains flat and ready to resume additive layering via the 3D printer.

A roller 143 may be used to flatten out any surface irregularities on the upper surface 144 of the layer 141 of the base object 111 that may arise after placement of the tray 120 and secondary materials 135. The roller 143 may be heated. The tray 120, an upper layer of the base object 111, and/or secondary materials 135 can be pre-heated prior to assembly. This can facilitate bonding of the primary and secondary materials and print layers between the pauses of the print cycle.

Figure 5:
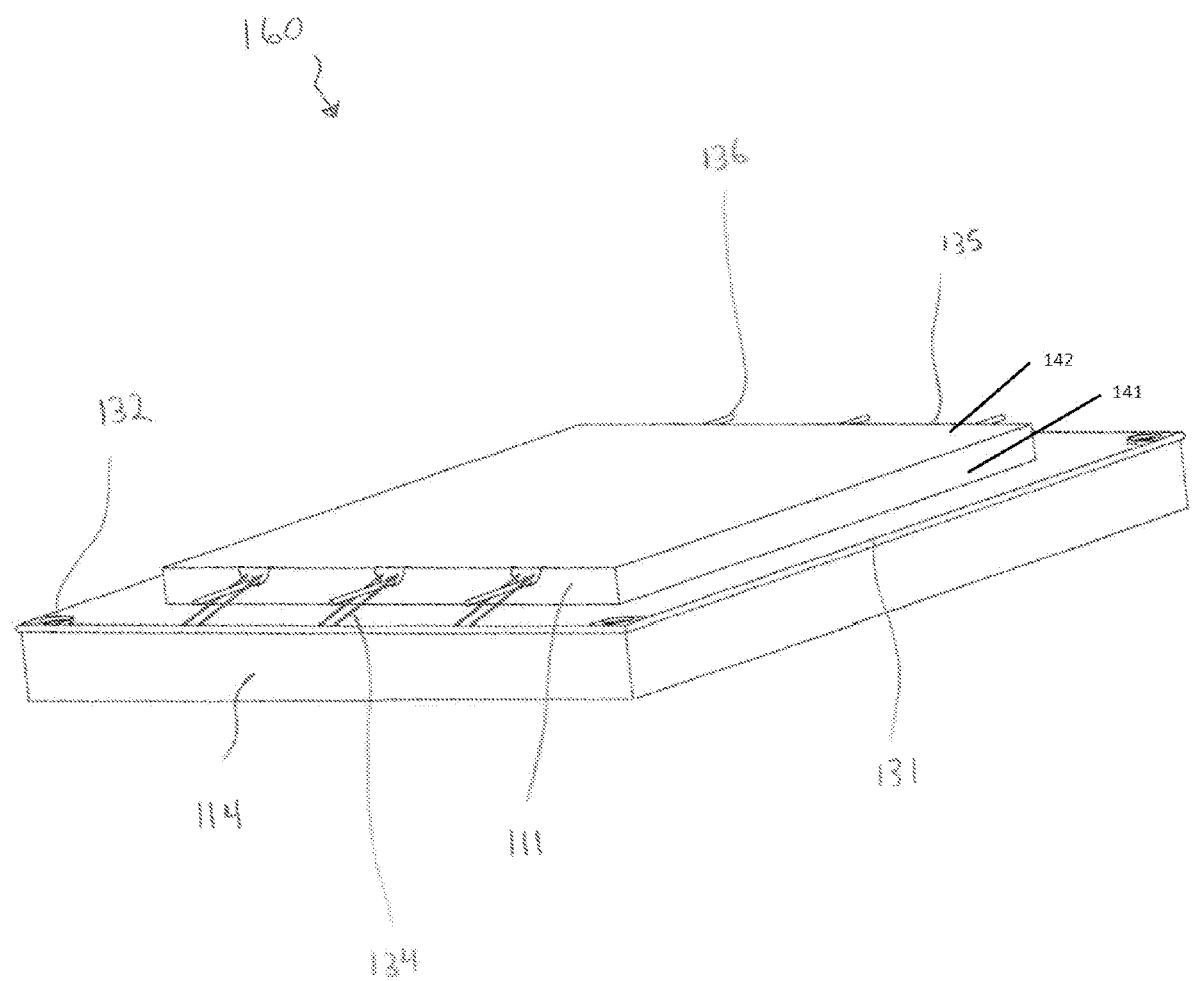
FIG. 5 is a diagrammatic view of the secondary materials integrated with the base object by addition of a second layer of material on the upper surface.

FIG. 5 shows the addition of at least on layer of printable material 142 applied over the upper surface 144 of the at least one layer 141 and the secondary material 135. The second layer 142 can fully or partially over the first layer 141 and/or fully or partially cover the secondary material 135. The first and second layers 141, 142 can comprise the same material or a different material. The second layer 142 can bond with the upper surface 144 of the first layer 141 and/or the secondary material 135.

After assembly of the first tray 120 and secondary materials 135, additional layers of material can be printed on the upper surface of the base object 111. The additional layers can include additional grooved indentations 112. An additional secondary tray 120 with suspended secondary materials 135 can be assembled with the base object 111 and the additional grooved indentations 112 as just described. This process can be repeated with additional recess, secondary materials and trays as desired. The tray 120 can nest within an earlier-place tray 120. For example, the posts 133 of a later-placed tray 120 can be fit within the hollow posts 133 of an earlier-place tray 120. The posts of the trays can be hollow and tapered downwardly to receive the downwardly tapered posts of subsequently placed trays.

Certain Terminology

Terms relating to semi-circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The term "sufficiently" as used herein represents a desired function or achieves a desired result.

SUMMARY

Several illustrative embodiments of additive manufacturing systems have been disclosed. Although this disclosure has been described in terms of certain illustrative embodiments and uses, other embodiments and other uses, including embodiments and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various embodiments. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one embodiment or example in this disclosure can be combined or used with (or instead of) any other portion of any of the steps, processes, structures, and/or devices disclosed or illustrated in a different embodiment, flowchart, or example. The embodiments and examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative embodiments have been described, any embodiments having equivalent elements, modifications, omissions, and/or combinations are also within the scope of this disclosure. Moreover, although certain aspects, advantages, and novel features are described herein, not necessarily all such advantages may be achieved in accordance with any particular embodiment. For example, some embodiments within the scope of this disclosure achieve one advantage, or a group of advantages, as taught herein without necessarily achieving other advantages taught or suggested herein. Further, some embodiments may achieve different advantages than those taught or suggested herein.

Some embodiments have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular embodiment of the inventions disclosed herein. No aspects of this disclosure are essential or indispensable. In many embodiments, the devices, systems, and methods may be configured differently than illustrated in the figures or description herein. For example, various functionalities provided by the illustrated modules can be combined, rearranged, added, or deleted. In some embodiments, additional or different processors or modules may perform some or all of the functionalities described with reference to the example embodiment described and illustrated in the figures. Many implementation variations are possible. Any of the features, structures, steps, or processes disclosed in this specification can be included in any embodiment.

In summary, various embodiments and examples of additive printing systems and related methods have been disclosed. This disclosure extends beyond the specifically disclosed embodiments and examples to other alternative embodiments and/or other uses of the embodiments, as well as to certain modifications and equivalents thereof. Moreover, this disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims.

The invention claimed is:

1. A method of additive printing a base object comprising:
depositing a first layer of the base object, the first layer forming an upper surface of the base object;
providing a recess within the upper surface;
assembling a tray coupled to a secondary material, the tray positioned below the upper surface of the first layer;
inserting the secondary material within the recess; and
depositing a second layer of the base object on the upper surface, the second layer extending over the secondary material within the recess.

2. The method of claim 1, further comprising:
flattening the upper surface and the secondary material within the recess with a roller before depositing the second layer.

3. The method of claim 2, wherein the roller is a heated roller.

4. The method of claim 1, wherein the secondary material comprises a wire, metal material, ceramic material, electronic component, or optical fiber.

5. The method of claim 1, wherein the secondary material comprises a non-printable material.

6. The method of claim 1, wherein an upper surface of the secondary material aligns with the upper surface of the first layer.

7. The method of claim 6, wherein the secondary material is configured to fill the recess and flatten the upper surface.

8. The method of claim 6, wherein the upper surface of the secondary material comprises a primary material of the base object.

9. The method of claim 8, wherein the secondary material is encased within the primary material.

10. The method of claim 1, further comprising:
preheating the secondary material before inserting the secondary material within the recess.

11. The method of claim 1, wherein the first layer comprises a plurality of layers of a material of the base object.

12. The method of claim 1, wherein the tray is assembled with a support substrate of the base object.

13. The method of claim 1, wherein the tray comprises a peripheral frame.

14. The method of claim 1, wherein the secondary material is attached with two sides of the tray by a wire.

15. The method of claim 14, wherein the wire is configured to provide sufficient slack that the tray can be positioned entirely below the upper surface of the first layer.

16. The method of claim 14, further comprising:
preheating the secondary material by passing an electrical current through the wire.

17. The method of claim 1, wherein the secondary material is attached with a film and the film is attached with the tray.

18. The method of claim 17, wherein the film is configured to provide sufficient slack that the tray can be positioned entirely below the upper surface of the first layer.

19. The method of claim 17, wherein the second layer is deposited over the film.

20. The method of claim 17, wherein the film comprises a primary material of the first layer or the second layer.

21. The method of claim 1, wherein the secondary material is attached with the tray by a pair of spaced wires to prevent rotation of the secondary material.

22. The method of claim 12, wherein the tray mechanically interlocks with the support substrate.

23. The method of claim 22, wherein the secondary material includes at least one post configured to be inserted within at least one corresponding aperture in the support substrate.

24. The method of claim 12, wherein the tray magnetically couples with the support substrate.

25. The method of claim 1, further comprising:
depositing a third layer of the base object over the second layer;
providing a second recess within an upper surface of the third layer;
inserting a second secondary material within the second recess; and
depositing a fourth layer of the base object on the upper surface of the third layer, the fourth layer extending over the second secondary material within the second recess.

26. The method of claim 25, further comprising:
assembling a first tray with a support substrate of the base object, the first tray positioned below the upper surface of the first layer, and the secondary material coupled with the first tray; and
assembling a second tray with the support substrate of the base object, the second tray positioned below the upper surface of the third layer, and the second secondary material coupled with the second tray.

27. The method of claim 26, wherein the second tray nests within the first tray.

28. The method of claim 1, further comprising:
measuring a position of the secondary material within the recess using a sensor before depositing the second layer;
comparing the position of the secondary material relative to a reference location; and
determining whether the position of the secondary material is acceptable.

29. The method of claim 28, further comprising:
in response to a determination that the position of the secondary material is acceptable, depositing the second layer of the base object on the upper surface; and
in response to a determination that the position of the secondary material is unacceptable, displaying an alert.

\* \* \* \* \*